United States Patent
Pedersen et al.

(10) Patent No.: US 6,449,293 B1
(45) Date of Patent: Sep. 10, 2002

(54) TEMPERATURE STABILIZATION OF OPTICAL WAVEGUIDES

(75) Inventors: Jens Engholm Pedersen; Martijn Beukema, both of Frederiksberg; Christian Vestergaard Poulsen, Nærum; Lars Erik Eskildsen, Lyngby, all of (DK)

(73) Assignee: Ionas A/S Birkerod (DK)

( * ) Notice: Subject to any disclaimer, the term of this patent is extended or adjusted under 35 U.S.C. 154(b) by 0 days.

(21) Appl. No.: 09/570,973

(22) Filed: May 15, 2000

Related U.S. Application Data

(63) Continuation of application No. PCT/DK98/00516, filed on Nov. 24, 1998.
(60) Provisional application No. 60/066,955, filed on Nov. 26, 1997.

(30) Foreign Application Priority Data

Nov. 24, 1997 (DK) .............................. 1339/97

(51) Int. Cl.⁷ ................................ H01S 3/30
(52) U.S. Cl. ............... 372/6; 372/64; 372/96; 372/34; 372/102; 385/47; 385/13
(58) Field of Search ................ 372/6, 39, 27, 372/64, 96, 34, 102; 385/47, 13; 356/350

(56) References Cited

U.S. PATENT DOCUMENTS 4,915,503 A * 4/1990 Pavlath .................. 356/350
5,426,714 A 6/1995 Gadkaree et al. ............. 385/39
5,682,447 A * 10/1997 Kuzyk et al. .................. 385/12

FOREIGN PATENT DOCUMENTS

| EP | 0840411 | 5/1988 |
| EP | 0840410 | 5/1998 |
| JP | 926379 | 1/1997 |
| JP | 955556 | 2/1997 |
| WO | 9726572 | 7/1997 |

OTHER PUBLICATIONS

Patent Abstracts of Japan of JP 9–55556 Dated Feb. 25, 1997.

Patent Abstracts of Japan of JP 9–26379 Dated Jan. 28, 1997.

* cited by examiner

*Primary Examiner*—Leon Scott, Jr.
(74) *Attorney, Agent, or Firm*—Ladas & Parry

(57) ABSTRACT

A method of temperature stabilizing an optical waveguide (11, 12) having a positive thermal optical path length expansion affixes the optical waveguide to at least two points of a material having a negative thermal expansion and comprises the material of a composite of a resin matrix having embedded therein fibers having a negative thermal expansion coefficient and optionally fibers having a positive thermal expansion coefficient, whereby to provide the negative thermal expansion.

29 Claims, 8 Drawing Sheets

TEMPERATURE STABILIZATION OF OPTICAL WAVEGUIDES

This application is a continuation of PCT/DK98/00516 filed Nov. 24, 1998, which claims benefit of 60/066,955 Nov. 26, 1997.

BACKGROUND OF THE INVENTION

The present invention relates to a method of temperature stabilizing an optical waveguide having a positive thermal optical path length expansion, in particular an optical fiber distributed feed back laser or a distributed Bragg reflector optical fiber laser.

The invention further relates to packaging of fiber lasers to reduce environmental influences, specifically such influences that act to reduce their performance. More specifically yet it relates to packaging techniques for fiber lasers that act to reduce frequency jitter and thus serve to create ultra narrow linewidth fiber lasers.

1. The Technical Field

It is well known in the field of optics that the performance of optical components depends on temperature via induced change in the optical path length. This dependence is due to a change of the refractive index (thermo-optic effect) and strain with temperature. Typically the thermo-optic effect yields the dominant contribution, and for most optical materials the thermo-optic coefficient is positive, i.e. the refractive index increases with increasing temperature. In silica this increase is of the order of $+11 \cdot 10^{-6}/°$ C. For components based on UV-written Bragg gratings in fibers or planar waveguides this results in a temperature drift of the center wavelength of approximately 0.01 nm/° C. Although this figure is approximately 10 times better than what can be obtained in semiconductor based optical components it is still too high for a range of important applications. A notable example is found in optical communication systems based on dense wavelength division multiplexing where the channel spacing may be e.g. 100 GHz/0.8 nm and system administration requires a wavelength drift no higher than 0.001 nm/° C., i.e. 10 times lower than the intrinsic value for UV-written Bragg gratings in fibers or planar waveguides. It is thus necessary to stabilize the wavelength.

Various methods of stabilizing the wavelength have been suggested in the art. In one method the temperature of the device is stabilized actively, e.g. by measuring the device temperature and controlling it through a suitable feedback. The disadvantage of this method is that energy is consumed which will dissipate to the rest of the system.

In other methods the thermo-optic coefficient is manipulated to balance the thermal expansion, or vice versa.

Generally, the temperature dependency of the center wavelength $\lambda$ of a Bragg grating in an optical fiber on temperature T is given by the following equation (1):

$$\frac{1}{\lambda} \cdot \frac{d\lambda}{dT} = \frac{1}{n} \cdot \frac{\partial n}{\partial T} + \alpha + \frac{1}{n} \cdot \frac{\partial n}{\partial \varepsilon} \cdot \frac{\partial \varepsilon}{\partial T} + \frac{1}{\Lambda} \cdot \frac{\partial \Lambda}{\partial \varepsilon} \cdot \frac{\partial \varepsilon}{\partial T} \quad (1)$$

where n, $\alpha$ and $\varepsilon$ are the values for the refractive index, the thermal expansion and the strain. $\Lambda$ is the Bragg grating period. The 1$^{st}$ term including the thermo-optic coefficient $$\frac{\partial n}{\partial T}$$

represents the change in refractive index with temperature, the 2$^{nd}$ term represents the thermal expansion coefficient of the optical fiber, the 3$^{rd}$ term including the elasto-optic coefficient $$\frac{\partial n}{\partial \varepsilon}$$

represents the change in refractive index with strain, and the last term represents the change in the Bragg grating period with strain.

From this equation the following methods for temperature stabilization can be suggested:

The thermo-optic coefficient is changed to cancel out the contributions from thermal expansion and strain. In most fiber optical materials these two effects act together to increase the center wavelength with temperature. However, by tailoring the optical material to provide a negative thermo-optic coefficient, the positive contribution from the remaining terms is balanced to provide a stable center wavelength. The disadvantage of this method is that it is not easy to produce an optical material that provides a negative thermo-optic coefficient while maintaining other properties of the material.

Alternatively, the optical fiber can be mounted on a substrate under tension in such a way that its effective thermal expansion becomes negative to compensate the normally positive contribution from the thermo-optic and photo-elastic coefficients. When the optical fiber is mounted under tension the equation (1) reduces to equation (2):

$$\frac{1}{\lambda} \cdot \frac{d\lambda}{dT} = \frac{1}{n} \cdot \frac{\partial n}{\partial T} + \alpha_s - \frac{1}{n} \cdot \frac{\partial n}{\partial \varepsilon} \cdot \alpha_f \quad (2)$$

where $\alpha_s$ and $\alpha_f$ are the thermal expansion coefficients of the substrate and the optical fiber, respectively. The thermal expansion coefficient of the substrate can be made negative by two methods.

In a method, the substrate can be composed of two materials of different length and having different positive thermal expansion coefficients. The shortest piece of material is made from the material with the highest positive thermal expansion coefficient, and the longest piece is made from the material with the lowest positive thermal expansion coefficient. By fixing one end of the short piece to one end of the long piece, the other ends of the two pieces will approach each other as the temperature is increased. This presumes that the lengths and material parameters are balanced correctly. When an optical fiber is mounted under tension between these ends its effective thermal expansion becomes negative. A disadvantage of this method is that careful adjustments of the lengths and thermal expansions of the two pieces are required in order to ensure that the negative effective thermal expansion compensates the positive thermo-optic coefficient.

In another method, the substrate consists of a single material with an intrinsic negative thermal expansion coefficient. An optical fiber is mounted under tension on the substrate. By selecting and/or designing a substrate material with a suitable value of the negative thermal expansion coefficient, the effective negative thermal expansion compensates the positive contribution from the thermo-optic and photo-elastic coefficients of the optical fiber. This method has the advantage that once the correct material composition has been provided no further adjustments are required in order to achieve a stable center wavelength. Thus, this method has the advantage of simplicity in the mounting process; the exact length of the fiber is not important. Furthermore, depending on the substrate material the mount can be made considerably more robust.

Other than a change in center wavelength, temperature variatons also influence the spectral linewidth of optical waveguide lasers, e.g. optical fiber lasers. The spectral linewidth of lasers, including single frequency rare earth doped fiber lasers, is ultimately determined by optical spontaneous emission noise, corresponding to the Shawlow-Townes limit. For rare earth doped fiber lasers this lies in the Hz to sub-Hz region. In practical implementations, however, environmental effects will affect the cavity stability and lead to linewidths well above the Shawlow-Townes limit. Thus, although long term drift in temperature can be compensated by specialised packaging techniques such as those described above, small and rapid temperature fluctuations cause jitter in the center frequency. The frequency shift due to the thermo-optic effect is approximately $10\text{--}5°$ C. $^{-1} \cdot v \cdot \Delta T$ Hz, where $v$ is the optical frequency and $\Delta T$ is the temperature change. As an example, if the frequency stability is required to be better than 1 MHz at 1550 nm, then the temperature fluctuations must be lower than $10^{-3°}$ C. This way temperature fluctuations in the environment result in an increase in the effective linewidth. Another important contribution to jitter and linewidth increase comes from acoustic vibrations which affect the cavity via the elasto-optic effect. To stabilise the laser frequency and reduce its linewidth it is thus necessary to protect it from environmental influences. In doing so it is necessary to consider both acoustic and temperature effects, and with regard to the latter it is specifically necessary to consider rapid variations in temperature.

2. Prior Art Disclosures

Chu et al. "Multilayer dielectric materials of $SiO_x/Ta_2O_5/SiO_2$ for temperature-stable diode lasers", Materials Chemistry and Physics, 42 (1995), pp. 214–216, discloses a $SiO_x/Ta_2O_5/SiO_2$ sandwiched waveguide design with an effective negative thermo-optic coefficient applied to temperature stabilizing diode lasers. Nothing is disclosed about temperature stabilizing optical waveguides.

U.S. Pat. No. 5,042,898 discloses a method wherein two pieces of different materials with different thermal expansion coefficients and different length are arranged to balance the thermo-optic coefficient of an optical fiber. This method has the disadvantage of requiring full control over the process used to fix the optical fiber to the substrate. Furthermore, the fiber is mounted suspended in the mount, which results in acoustic coupling and makes the packaging fragile. Finally, quartz is an ideal material candidate for the longer piece since quartz both has a very low thermal expansion coefficient and is cheap. However, quartz is also a fragile material.

International application WO 97/26572 discloses a method using a single substrate material with an intrinsic negative thermal expansion coefficient and a particular class of substrate material with intrinsic negative thermal expansion coefficient, lithium-alumina-silica type ceramic glasses heat treated to develop the beta eucryptite crystal phase. Beta eucryptite being a ceramic glass is potentially fragile. It exhibits thermal expansion anisotropy which results in microcracks. Patent Abstract of Japan Vol. 97, No. 6, abstract of JP-A-9 055 556 discloses a method of protecting an optical fiber against damage by coating a looped optical fiber and then encasing it by producing a resin coated sheet containing it.

DISCLOSURE OF THE INVENTION

Object of the Invention

It is the object of the present invention to provide a method of temperature stabilizing an optical waveguide having positive thermal optical path length expansion. in particular an optical fiber distributed feed back laser, or a distibuted Bragg reflector optical fiber laser, and thus to provide a robust temperature stabilized optical waveguide.

It is a further the object of this invention to provide a method for packaging optical fiber lasers so that they are protected from rapid environmental fluctuations such as those arising from small and rapid temperature variations or acoustic vibrations, thus producing optical fiber lasers with ultra narrow spectral linewidths.

Solution According to the Invention

This object is achieved by providing a method of temperature stabilizing an optical waveguide having a positive thermal optical path length expansion.

According to the invention, the method comprises affixing the optical waveguide to at least two points of a composite material having a negative thermal expansion; said composite material comprising a resin matrix having embedded therein fibers having a negative thermal expansion coefficient, and optionally fibers having a positive thermal expansion coefficient.

It is obtained that the negative expanding composite material compensates the positive contribution to the change in optical path length from the thermo-optic and photo-elastic coefficients of the optical waveguide. Furthermore, the composite material is easy to fabricate and exhibits high mechanical strength. This is very useful in construction of mechanical parts whereby a robust temperature stabilized optical waveguide is provided.

Also in case of both fibers of negative and positive thermal expansion coefficients being present, the negative thermal expansion of the final composite material can be accurately adjusted to a desired value.

Also, strong reinforcing fibers e.g. glass fibers can further improve the mechanical properties.

Fibers having a negative thermal expansion coefficient are known in the art. Suitable fibers are disclosed in U.S. Pat. No. 4 436 689, the content of which is incorporated by reference.

The object of packaging optical fiber lasers to produce ultra narrow spectral linewidth sources is achieved as stated in claim 22, namely by a method of packaging a fiber laser inside a matrix of curable viscous material that acts to dampen acoustic vibrations and temperature fluctuations.

This reduces the environmentally induced jitter of the laser and consequently reducing the spectral linewidth of the laser.

Preferred Embodiments

Fibers having a suitable negative thermal expansion coefficient can be used.

Generally, it is preferred that the fibers having a negative thermal expansion coefficient have a negative thermal expansion coefficient in the range from $-5 \cdot 10^{-6}/°$ C. to $-12 \cdot 10^{-6}/°$ C., preferably from $-9 \cdot 10^{-6}/°$ C. to $-12 \cdot 10^{-6}/°$ C.

The concentrations of fiber materials and resin matrix material are chosen to ensure that a composite material with the desired numerical value of the negative thermal expansion coefficient in order to compensate for the thermo-optic and elasto-optic coefficients is obtained.

It is preferred that the fibers are in an amount of 40 to 70% by volume.

The fiber materials may be present in any suitable form. Generally, it is preferred that the fibers are interwoven in the sence that fibers having different orientations are provided, which allows for longitudinal and transverse adjustment of the negative thermal expansion.

It is preferred that the composite material comprises 60% to 100% axially orientated fibers and 0% to 40% transversally orientated fibers.

Generally it is preferred that the fibers are arranged in a laminated structure of more than one layer whereby a particular good stability is obtained. Thus, for a given mechanical stability, a laminated structure including more layers allows for a higher percentage of fibers oriented axially whereby a numerically higher value of the negative thermal expansion coefficient is ensured. Other structures than laminated structures are possible.

Generally, fibers having a negative thermal expansion coefficient can be of any suitable material.

In preferred embodiments the fibers are fibers of materials selected from the group consisting of polyethylene, aramide, polyacrylate, polybenzobis-oxozole, polybenzobisthiazole, polyethylene naphthalene, polyethylene sulfide, polyamide-imide, polyether ether ketone, and polyethylene terephthaline, alone or in combination.

Polyethylene and aramide fibers are preferred. Particularly polyethylene fibers of the type Dyneema SK60, SK65, and SK66 and similar are preferred since these fibers have numerically high negative thermal expansion coefficients of about $-12 \cdot 10^{-6}/°$ C.

The resin matrix is any suitable resin matrix in which the fibers can be embedded with a suitable adhesion. In preferred embodiments the resin is a thermo-curing resin. It is preferred that the resin matrix is a consolidated matrix of epoxy resins, unsaturated polyester resins, vinyl ether resins, urethane resins and urethane acrylate resins.

In a particularly preferred embodiment the fibers are of polyethylene, especially those of the type Dyneema SK60, SK65, and Dyneema SK66, and the resin is an epoxy resin which is found most useful for these fibers.

Generally, a composite material having a negative thermal expansion according to the invention exhibits any desired negative thermal expansion coefficient. For the temperature stabilization of optical fibers, e.g. optical fibers with Bragg grating, it is preferred that the composite material exhibits a negative thermal expansion coefficient in the range from $-4 \cdot 10^{-6}/°$ C. to $-10 \cdot 10^{-6}/°$ C., preferably in the range from $-6 \cdot 10^{-6}/°$ C. to $-9 \cdot 10^{-6}/°$ C.

Affixing of the optical waveguide to at least two points of the composite material having a negative thermal expansion can be established by any suitable method. E.g. affixing the optical waveguide to at least two points includes affixing the whole length of the optical waveguide.

In a preferred embodiment, a controlled tension is applied to the optical waveguide prior to affixing it to the composite material so that it is ensured that the thermal expansion of the waveguide is determined solely by the thermal expansion of the substrate and not by the thermal expansion of the waveguide itself over the temperature interval specified for the device.

Generally, any suitable optical waveguide can be temperature stabilized, e.g. single and multimode optical fibers.

In a preferred embodiment, the optical waveguide is an optical fiber, preferably a single mode fiber, the properties of axial symmetry and the flexibility of which make it particularly simple to temperature stabilize by affixing it to a composite material having a negative thermal expansion.

In another preferred embodiment, the optical waveguide is an optical fiber device, such as a reflection Bragg grating or notch filter, further preferably being polarization stable.

Particularly preferred optical waveguides include optical fiber lasers, preferably polarization stable, such as optical fiber distributed feed back lasers or distributed Bragg reflector optical fiber lasers, in particular rare earth doped optical fiber distributed feed back lasers having UV-induced Bragg gratings or rare earth doped distributed Bragg reflector optical fiber lasers also having UV-induced Bragg gratings. The rare earth dopants include the elements: La, Ce, Pr, Nd, Sm, Eu, Gd, Tb, Dy, Ho, Er, Tm, Yb, and Lu.

Particularly preferred are stable polarization mode optical fiber distributed feed back lasers or stable polarisation mode distributed Bragg reflector optical fiber lasers. Stable single polarization mode operation of these devices is necessary for a number of important applications including optical communication where external modulation requires the use of polarization sensitive devices such as lithium niobate modulators.

In a preferred embodiment the optical fiber laser is spliced to a polarization maintaining fiber, and the polarization axes of the optical fiber laser and the polarization maintaining fiber have been aligned by twisting the fiber axes relative to each other prior to affixing both the optical fiber laser and the polarization maintaining fiber to the composite material having negative thermal expansion whereby the polarization extinction is optimized at the other end of the polarization maintaining fiber so that there is one predominant linear polarization.

The composite material having negative thermal expansion can be in any suitable form. In a preferred embodiment the composite material having negative thermal expansion is in the form of a tube or coating on the optical waveguide having a positive thermal optical path length expansion, whereby the optical waveguide affixed onto the interior part thereof is protected from external chock. Such a temperature stabilized optical waveguide is more compact; in particular in the specific embodiment of a fiber coating.

In another preferred embodiment, the composite material having negative thermal expansion is in the form of a substrate for the optical waveguide having positive thermal optical path length expansion whereby particularly simple standardized forms of the composite material having negative thermal expansion can be used to affix the optical waveguide to be temperature stabilized.

The invention furthermore provides a temperature stable, packaged DFB or DBR fiber laser. The fiber laser is mounted on a substrate material as described above with an intrinsic negative thermal expansion coefficient matched to balance the change with temperature of the refractive index of the fiber laser fiber.

With respect to packaging of fiber lasers to dampen thermal and acoustic fluctuations and so reduce the spectral linewidth, it is preferred that the laser be fixed in a curable viscous substance.

It is preferred that the cured substance in which the fiber laser is embedded has a high loss coefficient/dissipation factor in a wide range of vibration frequencies, specifically at acoustic frequencies. It is further preferred that the cured substance in which the fiber laser is embedded has a low thermal diffusivity so that transient heat flow is reduced.

BRIEF DESCRIPTION OF THE DRAWINGS

In the following, the invention is described in more detail with reference being made to the drawings in which.

DETAILED DESCRIPTION

Preparation of Composite Material

Figure 1:
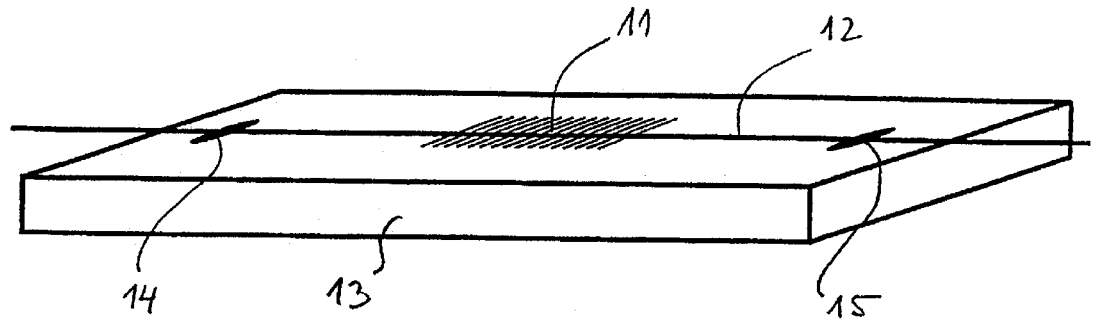
FIG. 1 shows a UV-written grating, e.g. an optical distributed feed back fiber laser, mounted on a planar substrate made from a composite material with negative thermal expansion coefficient according to the invention.

Suitable fibers for the composite material having negative thermal expansion according to the invention can be provided by methods known in the art.

U.S. Pat. No. 4,436,689 discloses a special type of ultra high molecular weight polyethylene (UHMW-PE) fiber. This fiber is used together with an epoxy resin to produce a negative thermal expansion composite material which is easy and cheap to manufacture and it can be machined in any size necessary. It is robust and resistant to chock and vibrations. The negative thermal expansion coefficient of the composite material can be tailored to a maximum numerical value that depends on the negative thermal expansion of the UHMW-PE fiber and the positive thermal expansion of the used epoxy resin.

The substrates are made of Dyneema SK60 fiber/epoxy resin laminate. Dyneema is the registered trademark of fibers made of polyethylene, via a gel spinning process in which a parallel macro-molecular orientation of 95% and a level of crystallization of up to 85% is achieved. The orientation is lost at temperatures above 144° C. The most important properties of the fiber are the negative expansion coefficient of $-12 \cdot 10^{-6}$/° C. (in the axial direction) and an E-modulus of 89 GPa (SK60) or 95 GPa (SK66). Similar products are commercially available e.g. products sold by Spectra Fibers.

The fibers are made in three grades: SK60, SK65 and SK66. SK60 is a general purpose grade used for e.g. ropes. SK65 has a higher axial tensile strength and modulus compared to SK60 and is therefore very useful in construction of mechanical parts. SK66 is specially designed for ballistic purposes. For the purpose of negative temperature coefficient substrates both SK60, SK65 and SK66 can be used. Until now, SK60 is preferred.

As a resin used in the laminate with the Dyneema fibers, any thermo-curing resin can be used which cures at temperatures of 140° C. or lower. Because of its mechanical properties epoxy resin is the most useful. The resin has a positive thermal expansion coefficient. To obtain improved adhesion to the resin, the SK60/SK65/SK66 fiber should be corona treated.

The negative thermal expansion coefficient of the composite substrates is determined by the volume ratio between fiber and resin as well as the orientation of the Dyneema fibers. The composite substrates are made so that is has a numerically large negative thermal expansion coefficient in one direction. For the composite substrates, a distribution of the fibers is chosen where 80% are oriented in one direction of the substrate and 20% perpendicular (90°) to this direction. In this way a relatively high negative temperature expansion coefficient in one direction (80% orientation) is created, whereas it still has sufficient mechanical stability in the other direction (20% orientation). A distribution of 85% and 15% is possible as well, resulting in an even higher negative thermal expansion with up to a maximum value of approximately $-9 \cdot 10^{-6}$/° C.

Composite materials based on Dyneema fibers and epoxy resin can be fabricated in several different ways:

a) A corona treated Dyneema fabric with the desired fiber distribution in the axial and transverse direction can be purchased and subsequently impregnated with resin and stacked to the desired thickness of the substrate (wet lay-up). The total thickness of the substrate depends on the number of layers of fiber fabric and the amount of resin. The minimum amount of resin is approximately 30% to 60% of the total volume. The resin cures at room temperature and can be post-cured at higher temperatures to enhance the high-temperature stability of the substrate, see e.g. example 1.

b) Unidirectional Dyneema/epoxy prepregs (UD-tape; corona impregnated and treated Dyneema fibers) are commercially available. Unidirectional means that all fibers are oriented along the same axis. The prepreg has a layer thickness of 0.25 mm. A substrate of larger thickness can be created by stacking the prepeg layers. In principle, every layer can be put in any desired orientation. The creation of the desired distribution of the fibers of 80% in the axial (0°) and 20% in the transverse direction (90°) can be achieved by changing the orientation of the layer of fibers relatively to the other layers. For example to create a substrate approximately 2.5 mm thick the following distribution of the layers can be used: first layer 0°, second layer 90°, third until the eight 0°, the ninth 90° and finally the tenth layer 0°. This substrate can be cured in an autoclave at temperatures up to 140° C. and pressures up to 6 bar. Because of the high pressure, a lower amount of resin can be used, which is approximately 40% of the volume. This will result in a substrate with a numerically higher negative thermal expansion coefficient. Post-curing conditions of the substrate depend on the curing temperature of the prepeg. If post-curing is necessary, the method discussed under a) can be used, but with a starting temperature 20° C. higher than the curing temperature of the resin.

c) A ready to use Dyneema/epoxy prepreg fabric can be purchased. This represents a combination of (a) and (b) with the desired distribution of fibers in the 0° and 90° orientation. The curing is as discussed under (b).

In addition, prepregs can be produced with different types of thermo curing resins.

Temperature Stabilization

FIG. 1 shows a sketch of an optical distributed feed back fiber laser 11,12 mounted on a planar substrate 13 made from a composite material with negative thermal expansion coefficient according to the invention which a grating 11 UV-written in a single mode optical fiber 12 which is affixed at two points 14,15 to the substrate. The grating is limited to the optical fiber. The exaggeration of the sketched grating into the substrate is only for illustration purposes.

Figure 2:
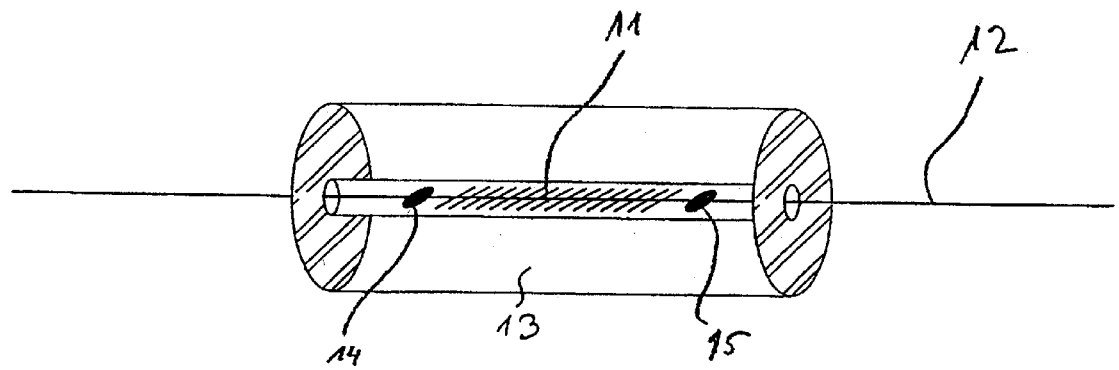
FIG. 2 shows a UV-written grating, e.g. an optical distributed feed back fiber laser, mounted in a substrate in the shape of a tube made from a composite material with a negative thermal expansion coefficient.

FIG. 2 shows an optical distributed feed back fiber laser 11, 12, mounted in a substrate 13 in the shape of a tube made from a composite material with a negative thermal expansion coefficient simular to FIG. 1.

In a preferred embodiment optical waveguides, such as UV-written Bragg gratings, are temperature stabilized by affixing the optical waveguide under controlled tension onto a composite material having a negative thermal expansion which balances the positive thermal optical path length expansion of the waveguide.

In another embodiment, optical fiber DFB lasers are temperature stabilized by using this composite material.

The composite material having a negative thermal expansion in a particularly preferred embodiment contains interwoven fibers, preferably polymer fibers, and epoxy. The negative thermal expansion property predominantly lies in the fiber and its structural alignment and/or its degree of crystallization. Traditional use of composite materials according to the present invention is e.g. as a construction material in the aeronautics industry e.g. for airplane parts.

Besides a high negative thermal expansion coefficient, the material qualities include high mechanical stability, ease of manufacture in large sizes and quantities, and low cost.

The negative expansion coefficient required is obtained from eq.2:

$$\alpha_s = -\frac{1}{n} \cdot \frac{\partial n}{\partial T} + \frac{1}{n} \cdot \frac{\partial n}{\partial \varepsilon} \cdot \alpha_f \qquad (\text{eq. 3})$$

Typical values are:

$n = 1.45$ (quartz)

$dn/dT = 11 \cdot 10^{-6}/° \text{C.}$ (quartz)

$1/n \cdot dn/d\varepsilon = -0.22$ (photo-elastic constant)

$\alpha_f = 0.55 \cdot 10^{-6}/° \text{C.}$ (quartz)

The required value for the composite material with negative thermal expansion coefficient therefore is approximately (depending on exact optical fiber parameters):

$\alpha_s = -7.7 \cdot 10^{-6}/° \text{C.}$

The specific examples of the composite material will produce tubes, coatings, or substrates with negative thermal expansion coefficient values of numerically up to approximately $9 \cdot 10^{-6}/° \text{C.}$ A temperature stabilized optical waveguide is obtained by affixing the optical waveguide under controlled tension on the composite material. Specifically an optical fiber laser with Bragg grating is first decoated in a small—typically 3–4 mm long—region on both sides of the grating. A controlled tension is then applied to the optical fiber in an amount so that both the desired center wavelength is obtained and the fiber remains under positive tension over the entire temperature interval specified for its function. This interval may typically be between −40° C. and +70° C. I.e., if the optical fiber is affixed to the composite material at room temperature, say 20° C., then it should still be under tension when heated to 70° C. With a temperature sensitivity of the center wavelength of e.g. 0.01 nm/° C. in a free optical fiber, tension to the optical fiber must therefore be applied in such an amount that the center wavelength moves at least +0.50 nm. After tension is applied, the optical fiber is affixed to the composite material using e.g. an adhesive that hardens considerably during curing and is free from creep and hysteresis over the temperature interval specified for the optical fiber laser.

Packaging of Fiber Lasers to Reduce Spectral Linewidth

Figure 7:
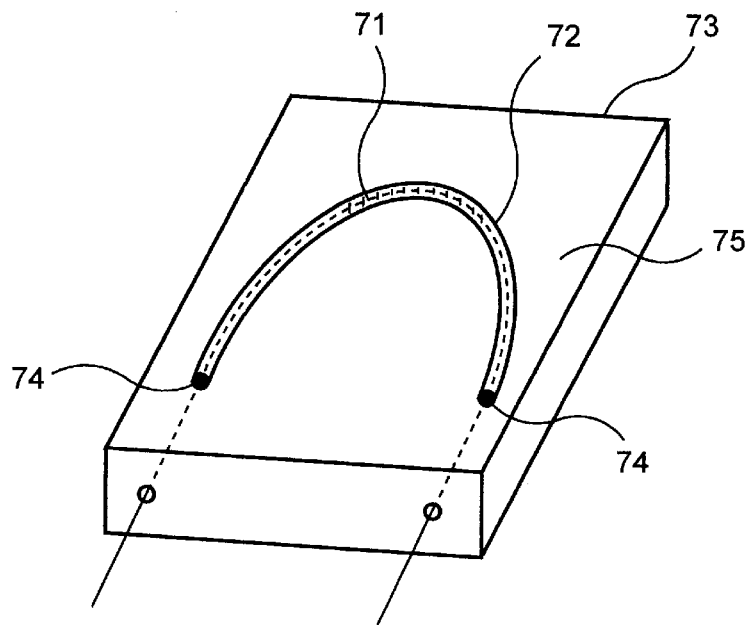
FIG. 7 shows a sketch of an optical fiber laser mounted in a package that acts to reduce jitter by encapsulating the laser in a substance with a high dissipation at acoustic frequencies and a low thermal diffusivity.

FIG. 7 shows a sketch of an optical fiber laser mounted in a package that acts to reduce thermal and acoustic fluctuations. The fiber laser 71 is first placed in a tube 72 of a suitable, stiff material such as metal or hard plastic. The tube has been preshaped to fit into a suitable size box 73. The ends are sealed with a suitable glue 74. The box is then half filled with the curable viscous substance 75, which is subsequently allowed to cure. The laser 71 in tube 72 is placed on top of the cured viscous substance 75, and the box filled with the same curable viscous substance 75. When the substance has cured completely, the box 73 is closed with a lid (not shown in FIG. 7). Placing the laser 71 in a sealed tube 72 isolates the laser 71 from the viscous substance 75. If placed directly in contact with the viscous substance 75, local strain fields could adversely affect the performance of the laser 71 during curing. At the same time, any thermal fluctuations or acoustic vibrations originating from the surrounding environment 76 can only reach the laser 71 via the cured viscous substance 75. If the material properties of this substance 75 are properly chosen it acts to dampen the jitter in the center frequency of the laser 71 arising from these effects.

The curable viscous substance 75 should have the following properties:

- a high loss coefficient/dissipation factor in a wide range of vibration frequencies, specifically at acoustic frequencies.
- a low thermal diffusivity so that transient heat flow is reduced.

Examples of such substances are silicone, sorbothane and other elastomers.

EXAMPLES

The invention is further illustrated by the following examples of preparation of the composite material having negative thermal expansion and of its application for temperature stabilizing optical waveguides.

Example 1

Fabrication of Composite Material

The preparation method (a) described above was chosen for the preparation of composite material. The Dyneema fiber fabric had a weight of 112.5 g/m$^2$ with 80% fiber in the axial and 20% fiber in the transversal direction. In total 10 layers of fabric were stacked and impregnated with LY5082/HY5083 epoxy resin from Ciba Geigy. This resin was cured at room temperature and was thermally stable up to 80° C. after 7 days of curing. After the first 24 hours of curing, vacuum was applied to improve adhesion between layers and to remove excess resin. The temperature at which the stability decreases (the glass transition temperature, $T_g$) was increased to 150° C. by post-curing the composite material. This post-curing is done in 5 steps:

a) heating up to 60° C. and maintaining this temperature for 2 hours
b) heating from 60° C. to 80° C. with steps of 1° C./minute, maintaining 80° C. for 2 hours
c) heating from 80° C. to 100° C. with steps of 1° C./minute, maintaining 100° C. for 2 hours
d) heating from 100° C. to 120° C. with steps of 1° C./minute, maintaining 120° C. for 2 hours
e) heating from 120° C. to 140° C. with steps of 1° C./minute, maintaining 140° C. for 2 hours Hereafter, the composite material was cut with a diamond saw into the desired size. To avoid rough composite material edges, the material was clamped between two 5 mm thick wooden plates.

The composite material exhibited negative thermal expansion, high mechanical strength, and ease of manufacture in large sites and quantities.

Example 2

Temperature Stabilizing an Optical Fiber Bragg Grating Based Notch Filter

Figure 3:
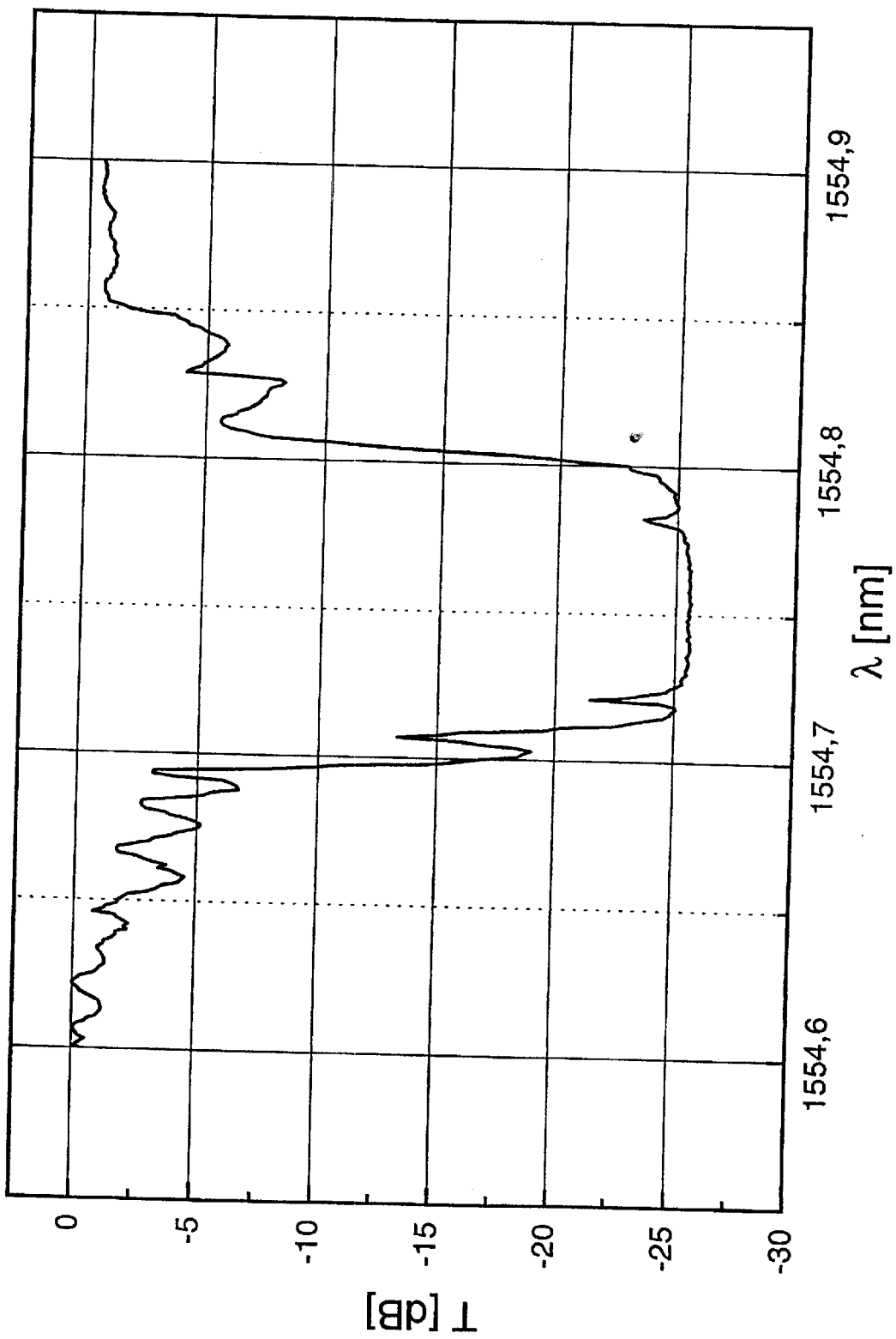
FIG. 3 shows a filter transmission characteristics measured with a Photonetics tunable external cavity semiconductor laser with a wavelength resolution of 1 $\mu$m.
Figure 4:
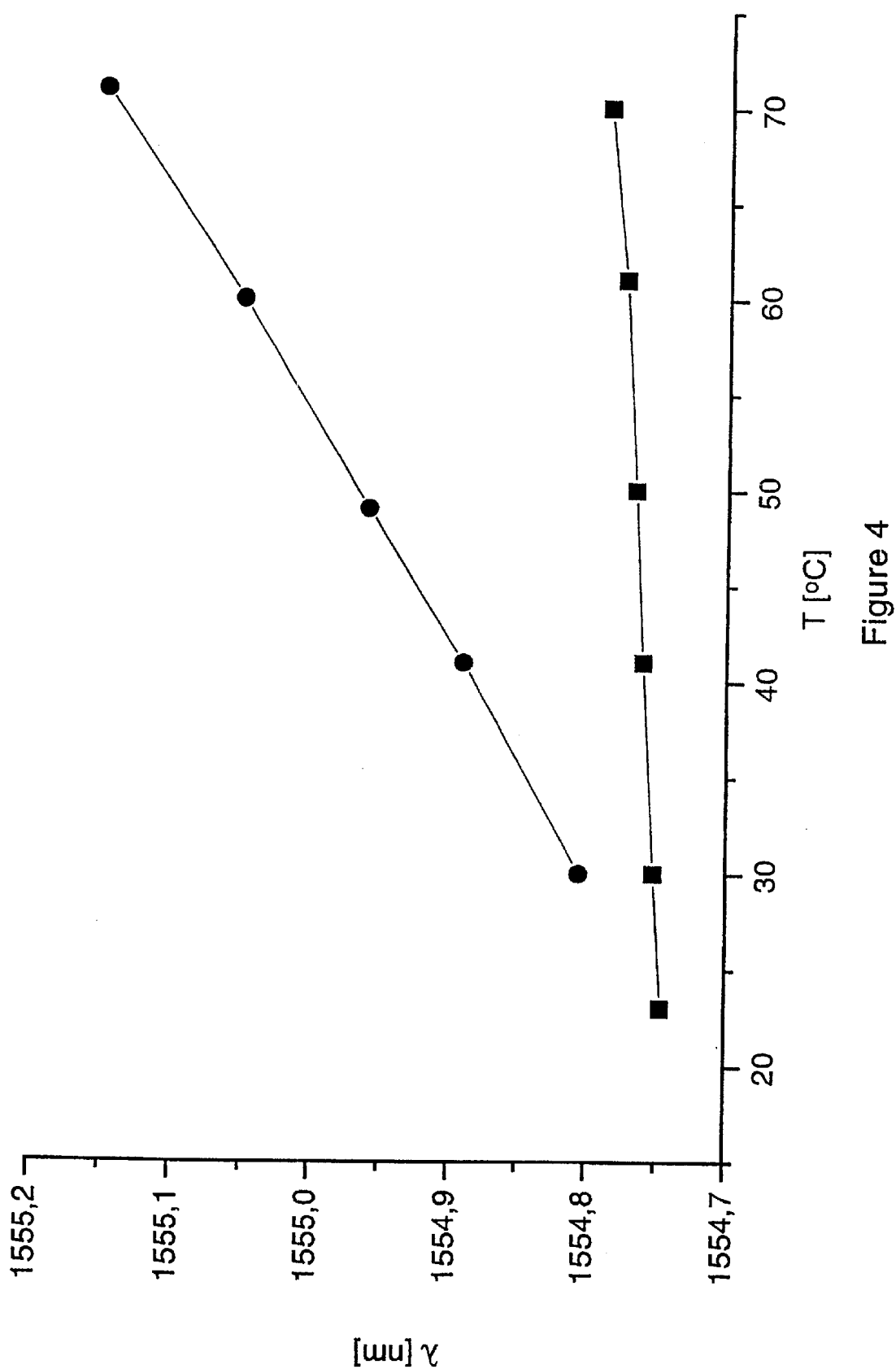
FIG. 4 shows a graph showing the athermal performance of a temperature stabilized grating notch filter (squares; average value+0.0008 nm/° C.) compared to a non-stabilized grating notch filter (circles; average value+0.008 nm/° C.)

A notch filter was photo induced in a UV-sensitive fiber. The fiber was purchased from FIBERCORE, fiber type PS1500, fiber number HD451-00 with a cut off wavelength of 1495 nm, numerical aperture 0.13, and an outer diameter of 125 $\mu$m. The fiber was sufficiently UV-sensitive so that no hydrogen or deuterium loading was necessary for writing strong gratings. The fiber was de-coated over a length of 7 cm to allow the phase mask to rest only on the decoated fiber section. It was then placed in a set of V-grooves, tension was applied and the phase mask was placed on top of the decoated fiber section (5 cm long phase mask having a mask period of 1067 nm and zero-order suppression better than 2%, purchased from QPS, Canada, S/N 6020YA-15-50-3). The grating was photo induced in the optical fiber using a Lambda Physics model COMPEX 205 KrF excimer laser operating at 248 nm. The fiber was subjected to a total fluence of approximately 250 J/cm$^2$ which provided a 20 dB notch filter with a spectral characteristic as shown in FIG. 3 measured with an ANDO model AQ-6315A double monochromator optical spectrum analyzer with a wavelength resolution of 0.05 nm. The grating was stabilized by annealing at 200° C. for ½ hour. A temperature stabilized optical fiber was obtained by affixing the optical fiber under controlled tension corresponding to approximately 1 nm on the negative expansion coefficient substrate. Tension was first applied so that both the correct center wavelength was obtained and the fiber remained under positive tension over the temperature interval specified for the component. This interval is typically between −40° C. and +70° C. I.e., if the fiber is affixed at room temperature, say 20° C., then it should still be under tension when heated by 50° C. up to a temperature of 70° C. The center wavelength temperature sensitivity in a free optical fiber of this type is 0.0084 nm/° C. A tension corresponding to a center wavelength shift of at least 0.42 nm must thus be applied to the fiber. After tension was applied, the fiber was glued to the substrate using a glue that hardens considerably after curing and is free from creep and hysteresis over the temperature interval specified for the component. The temperature stablized grating had a center wavelength temperature sensitivity of 0.0008 nm/° C. This should be compared with a sensitivity of 0.0084 nm/° C. of the free grating in FIG. 4. I.e. an improvement of approximately a factor 10 was obtained through temperature stabilization using the negative thermal expansion composite material according to the present invention.

Example 3

Temperature Stabilizing an Optical Fiber DFB Laser

Figure 5:
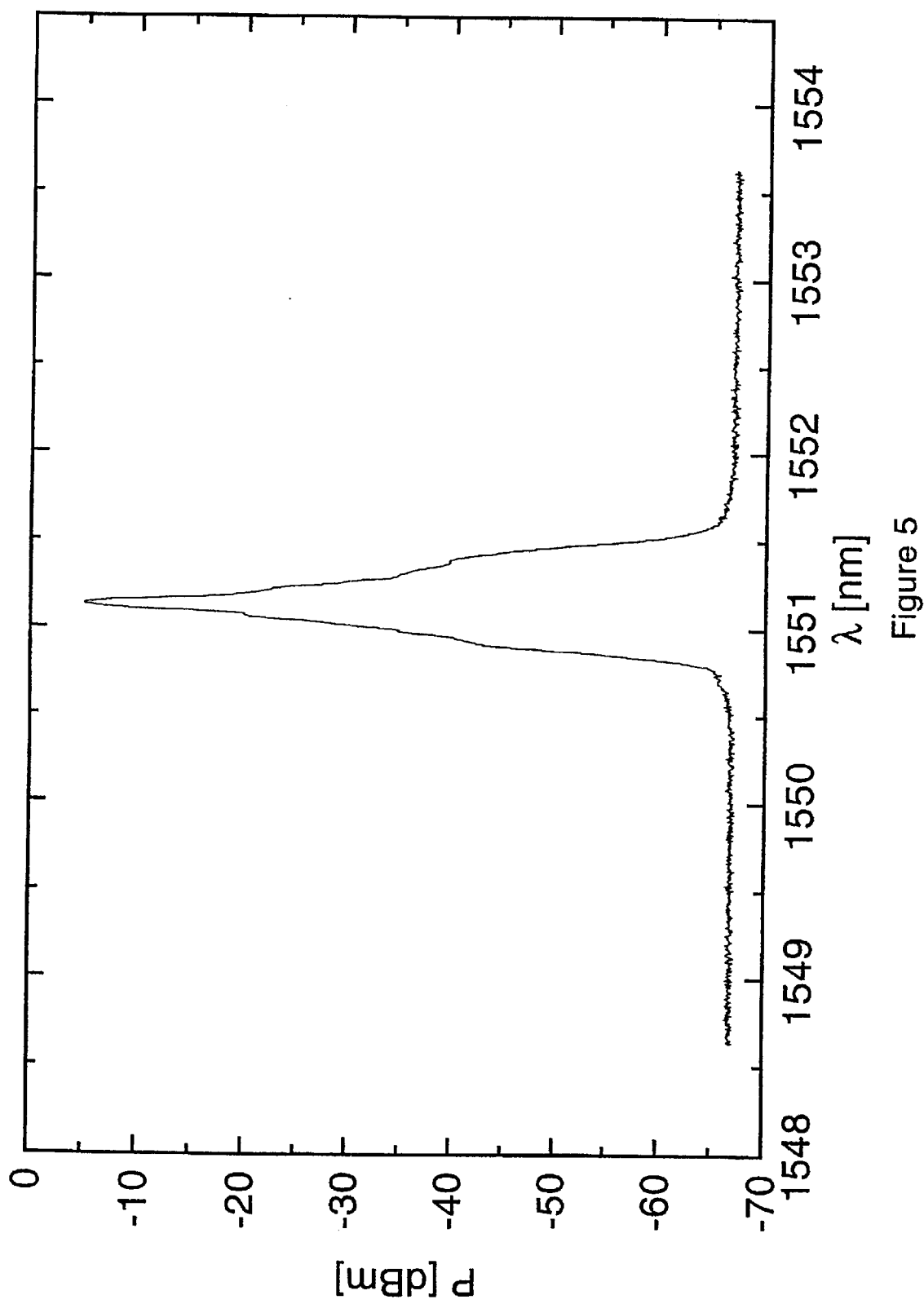
FIG. 5 shows a graph showing the laser spectrum as measured on an ANDO model AQ-6315A double monochromator optical spectrum analyzer with a wavelength resolution of 0.05 nm.
Figure 6:
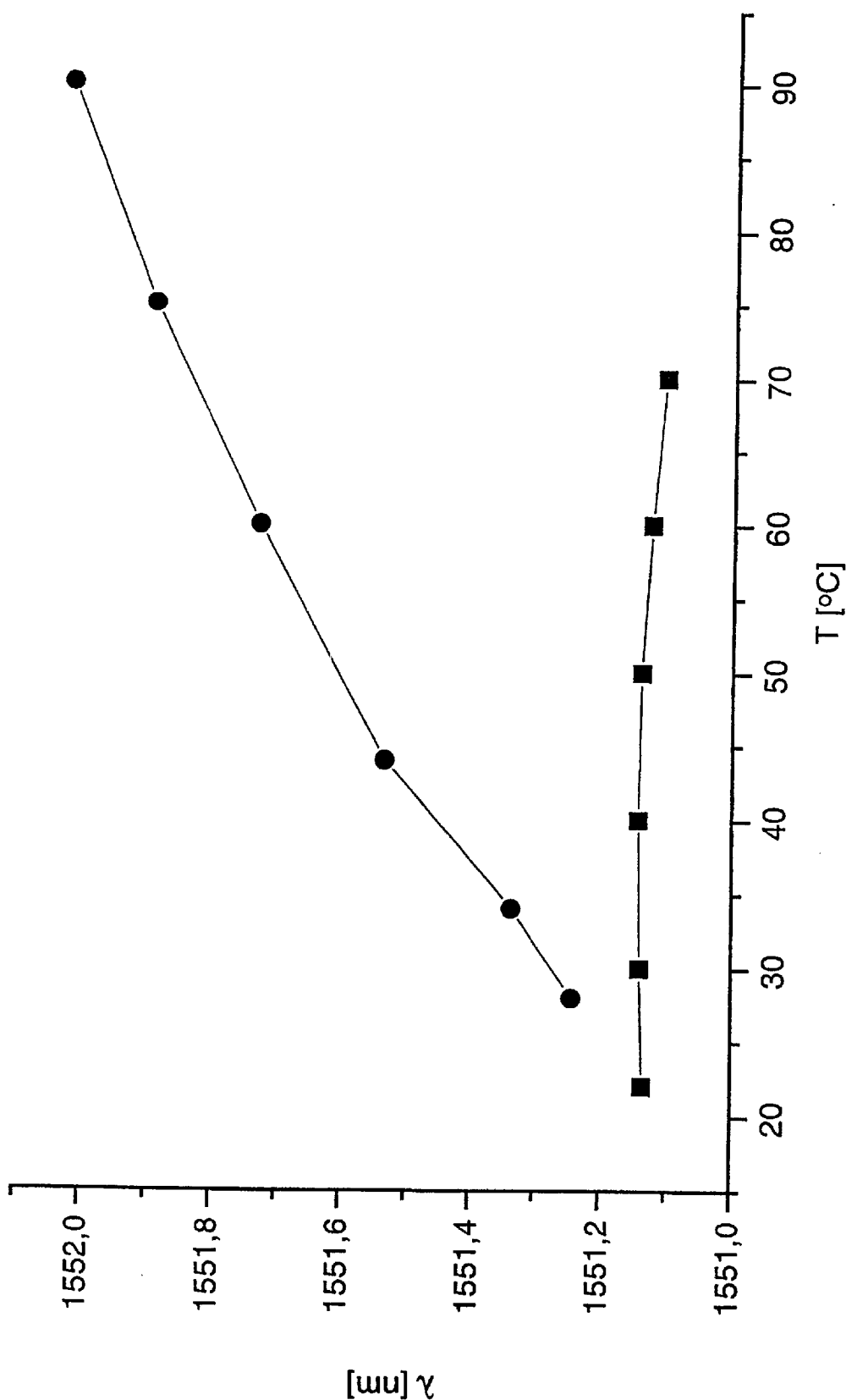
FIG. 6 shows a graph of the athermal performance of a temparature stabilized fiber DFB laser (squares; average value −0.0006 nm/° C.) compared to a non-stabilized fiber DFB laser (circles; average value+0.013 nm/° C.)

An optical fiber laser has a phase shifted reflective grating in a UV-sensitive erbium doped fiber. The UV-sensitive erbium doped optical fiber was purchased from LUCENT Denmark, fiber ID 930810. The fiber has a core, a cladding and an intermediate region and a dopant concentration of 1.5·10$^{25}$ atoms m$^{-3}$ in the core which has a diameter of 4 $\mu$m and a numerical aperture of 0.27. It has an outer diameter of 80 $\mu$m. The fiber has a photorefractive dopant profile comprising germanium in the intermediate region. The fiber is sufficiently UV-sensitive that no hydrogen or deuterium loading is necessary for writing strong gratings. The optical fiber laser was fabricated by splicing a 5 cm decoated length of the UV-sensitive erbium doped fiber to ordinary, non-doped fiber. It was then placed in a set of V-grooves, controlled tension was applied, and a phase mask was placed on top of the doped optical fiber section. The Bragg grating was photoinduced using a Lambda Physics model COMPEX 205 KrF excimer laser operating at 248 nm illuminating the 5 cm long phase mask having a mask period of 1067 nm and zero-order suppression better than 2% (S/N 6020YA-15-50-3, purchased from QPS, Canada). The optical fiber was subjected to a total fluence of approximately 1.2 kJ/cm$^2$, creating a 99% reflective grating as measured on an ANDO model AQ-6315A double monochromator optical spectrum analyzer with a wavelength resolution of 0.05 nm. After grating growth, a phase shift was induced in the center part of the grating by subjecting only a 4 mm long section of the 50 mm long grating to UV exposure. Typically an additional fluence of 0.4 kJ/cm$^2$ was necessary to obtain lasing. The laser was stabilized by annealing at 200° C. for ½ hour. The laser spectrum shown in FIG. 5, was measured with an ANDO model AQ-6315A double monochromator optical spectrum analyzer with a wavelength resolution of 0.05 nm. The laser was monitored with a scanning Fabry-Perot interferometer with a free spectral range of 10 GHz, and exhibited single polarization and longitudinal mode operation. The laser had a side-mode suppression ratio better than 60 dB. A temperature stabilized optical fiber DFB laser was obtained by affixing the optical fiber DFB laser under controlled tension on a composite material having negative thermal expansion as prepared in Example 1. Controlled tension was first applied so that both the correct center wavelength was obtained and the optical fiber remained under positive tension over the temperature interval of typically between −40° C. and +70° C. I.e., if the optical fiber was affixed at room temperature, say 20° C., then it would still be under controlled tension when heated by 50° C. to 70° C. The center wavelength temperature sensitivity in a free optical fiber DFB laser is approximately 0.013 nm/° C. A tension corresponding a center wavelength shift of at least 0.65 nm must thus be applied to the optical fiber. After tension was applied, the fiber was glued to the composite material using a glue that hardens considerably after curing and is free from creep and hysteresis over the temperature interval typically between −40° C. and +70° C. In FIG. 6, the performance of the temperature stabilized optical fiber DFB laser, −0.0006 nm/° C. (average value over the interval 20–70° C.), was compared with that of the non-stablized optical fiber DFB laser, 0.013 nm/° C. (average value over the interval 20–90° C.) I.e. an improvement of more than a factor of 10 was obtained through temperature stabilization using the composite material having negative thermal expansion.

Example 4

Temperature Stabilizing an Optical Fiber DFB Laser Spliced to a Polarization Maintaining Fiber An optical fiber laser fabricated as described in the previous example was spliced to a polarization maintaining (PM) fiber (3M elliptical cladding FS-CG-7421) using an Ericsson splicer FSU 925 PM-A. Although the splicer includes facilities to auto-splice PM fiber to PM fiber, the optical fiber laser fiber in itself is not PM. In order to optimize the polarization extinction at the output of the PM fiber it is necessary to align the polarization axis of the laser light to the polarization axis of the PM fiber. The axes must therefore be aligned manually. This can be done in two ways. Either the PM fiber is rotated manually prior to splicing while monitoring the polarization extinction at the output of the PM fiber. This method suffers from severe instabilities in the laser due to a varying and significant feedback to the laser cavity from the etalon created between the spliced fibers. Alternatively, the PM fiber is spliced without regard to the polarization axes. This facilitates the splicing procedure significantly. The polarization axes can be aligned subsequently during the mounting procedure by first affixing one end of the optical fiber laser and then rotating the PM optical fiber while monitoring the polarization extinction. When the best extinction is obtained, the PM optical fiber side of the fiber laser is also fixed.

Example 5

Figure 1A:
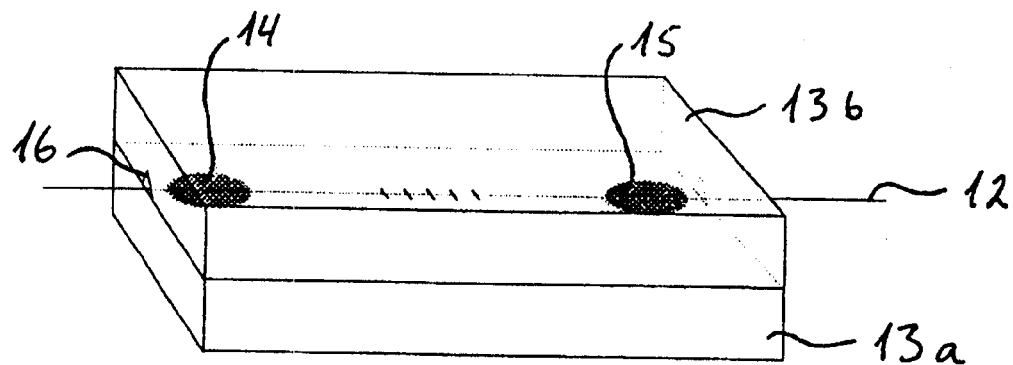
FIG. 1a shows a UV-written grating, e.g. an optical distributed feed back fiber laser or a distributed Bragg reflector optical fiber laser, mounted in between two planar substrates made from a composite material with negative thermal expansion coefficient according to the invention.

Alternative Ways to Mount the Optical Waveguide on a Temperature Compensating Substrate Refering to FIG. 1a, the optical waveguide 12 is mounted between two composite substrates 13a, 13b with a negative expansion coefficient. A V-groove 16 has been fabricated in the upper substrate 13b so that there is no contact between the optical waveguide 12 and the upper substrate 13b. In case the optical waveguide 12 is coated, for example with an acrylate or a polyimide coating, this coating should partly be removed on the places 14, 15 where the optical waveguide is mounted to the lower composite substrate 13a. Before the upper substrate 13b is fixed on top of the lower substrate 13a, the optical waveguide 12 is stressed under control to a wavelength which is slightly below the target center wavelength, preferably by using a microstage. At the two outer ends of the lower substrate 13a two areas of adhesive 14, 15 will be placed. The mounting is done with an adhesive that hardens considerably after curing and is free from creep and hysteresis over the temperature interval specified for the component. This is followed by the placement of the upper substrate 13b. At the sides of the sandwiched substrates an area of adhesive will be attached. In order to press the upper substrate 13b tightly to the lower substrate 13a, a weight is placed on top of the sandwiched structure. Finally the optical waveguide 12 is stressed to the preferred center wavelength.

Figure 1B:
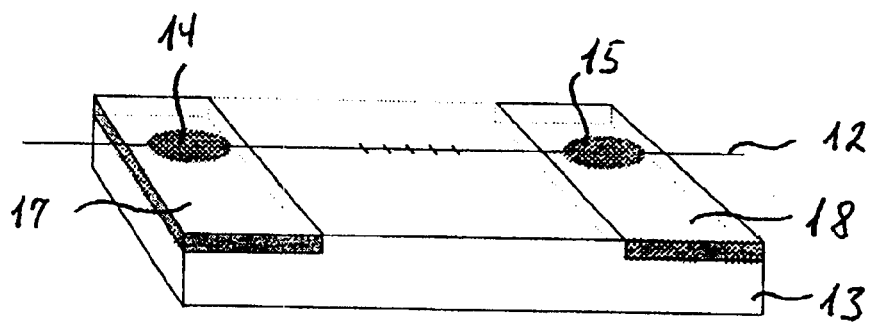
FIG. 1b shows a UV-written grating, e.g. an optical distributed feed back fiber laser or a distributed Bragg reflector optical fiber laser, mounted on a planar substrate made from a composite material with negative thermal expansion coefficient according to the invention. Two pieces of quartz glass are mounted on the substrate.

In a second method as illustrated in FIG. 1b, two thin pieces of planar quartz glass 17, 18 are mounted on the substrate 13, in such a way that the upper surface of the quartz glass pieces 17, 18 are in alignment with the upper surface of the composite substrate 13. The pieces of quartz glass 17, 18 can be mounted with any adhesive, preferably with an adhesive which has a thermal expansion coefficient in between the thermal expansion of quartz glass and that of the composite substrate 13. The quartz glass pieces 17, 18 should be mounted tightly against the edge of the substrate 13, The optical waveguide 12 is then mounted with an adhesive as described in the first method (cf. FIG. 1a, 14,15). Preferably the two areas of adhesive 14, 15 are supported with pieces of quartz glass (not shown in FIG. 1b) on top of the bonds.

Figure 1C:
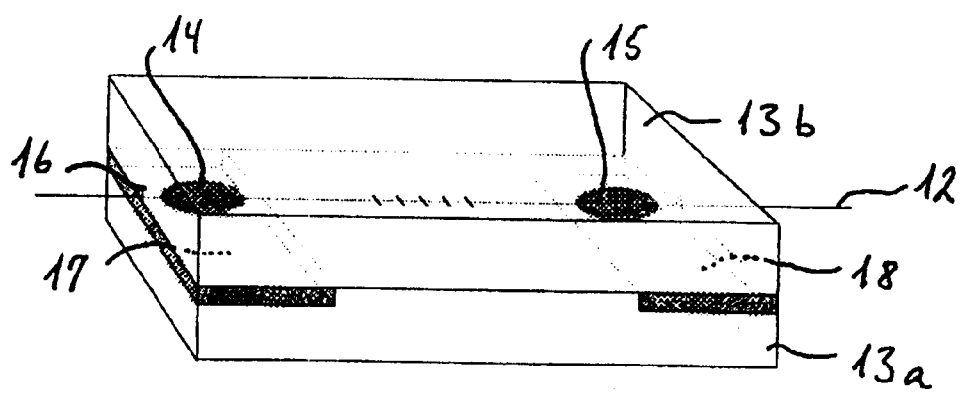
FIG. 1c shows a UV-written grating, e.g. an optical distributed feed back fiber laser or a distributed Bragg reflector optical fiber laser, mounted in between two planar substrates made from a composite material with negative thermal expansion coefficient according to the invention. Two pieces of quartz glass are mounted on the lower substrate.

A third method is illustrated in FIG. 1c. The optical waveguide 12 is mounted in between two composite substrates 13a, 13b as described in the first method (cf. FIG. 1a). The lower substrate 13a is prepared with quartz glass pieces 17, 18 as described in the second method (cf. FIG. 1b).

Figure 1D:
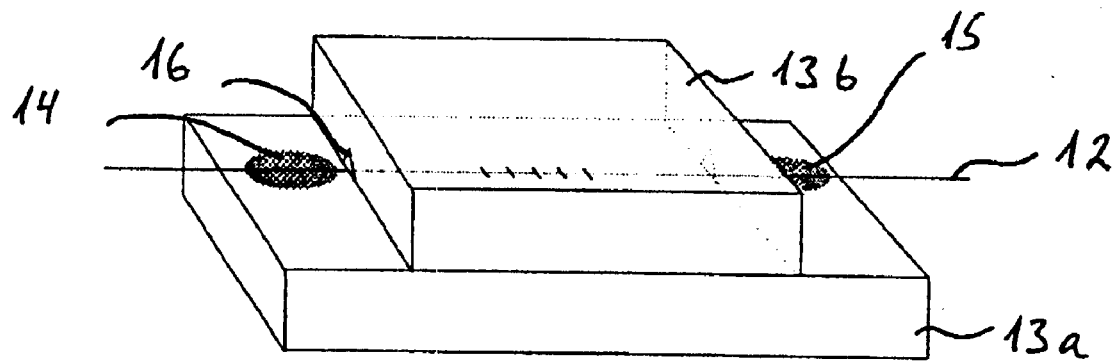
FIG. 1d shows a UV-written grating, e.g. an optical distributed feed back fiber laser or a distributed Bragg reflector optical fiber laser, mounted in between two planar substrates made from a composite material with negative thermal expansion coefficient according to the invention.

A fourth method is illustrated in FIG. 1d. This method is nearly identical to the method shown in FIG. 1a. The difference to the first method lies in the length of the upper substrate 13b which is equal to the length of the lower substrate 13a minus the length of the parts where the optical waveguide is mounted 14, 15. The upper substrate 13b, which is performed with a 'V-groove' 16, as described in the first method (cf. FIG. 1a), is mounted on the lower substrate 13a using an adhesive which has a thermal expansion close to that of the composite substrates 13a, 13b. Preferably the assembled substrates should be annealed at a temperature between 40 and 100 degrees celcius for an appropriate length of time. Hereafter the optical waveguide 12, for example an optical distributed feedback laser or a distributed Bragg reflector optical fiber laser, is pulled through the hole between the upper 13b and the lower 13a substrate. Controlled tension is then applied to the optical waveguide 12 to obtain the preferred center wavelength. The optical waveguide 12 is finally mounted with an adhesive as described in the first method (cf. FIG. 1a). Preferably the two areas of adhesive 14, 15 are supported with pieces of quartz glass (not shown in FIG. 1d) on top of the bonds.

Figure 1E:
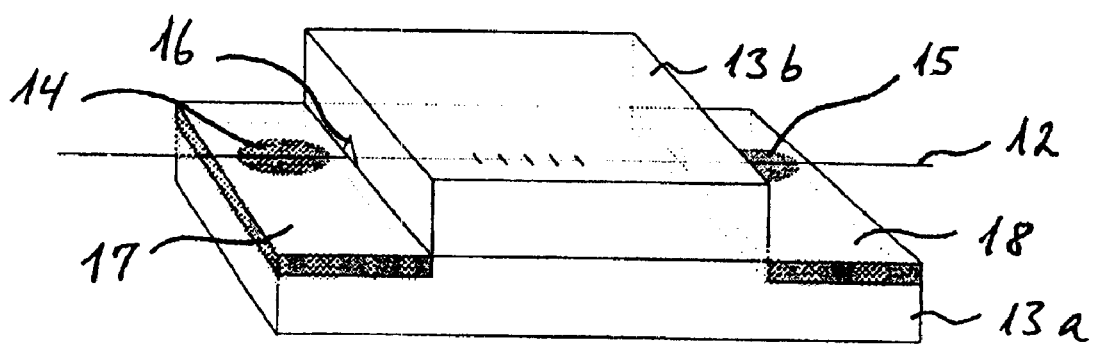
FIG. 1e shows a UV-written grating, e.g. an optical distributed feed back fiber laser or a distributed Bragg reflector optical fiber laser, mounted in between two planar substrates made from a composite material with negative thermal expansion coefficient according to the invention. Two pieces of quartz glass are mounted on the lower substrate.

A fifth method is illustrated in FIG. 1e. This method is nearly identical to the fourth method as described above. The lower substrate 13a is prepared as described in the second method (cf. FIG. 1b). The optical waveguide 12 is mounted as described in the fourth method (cf. FIG. 1d).

Example 6

Postcuring of the Composite Material

The composite material is fabricated as described in example 1, after which it is post-annealed for an appropriate time at temperatures preferably between 40 and 120 degrees Celcius.

Example 7

Alternative Fiber Distribution with Aramide/Kevlar Fiber

The composite material is fabricated as described in example 1. The fabric is a combination of Dyneema fibers and kevlar fibers, e.g. in a distribution of 62% Dyneema and 28% kevlar in one direction and 10% Dyneema fiber in the perpendicular direction, with a total weight of 138 g/M$^2$.

Example 8

Packaging of Fiber Lasers to Reduce Jitter and Obtain Narrow Spectral Linewidths FIG. 7 shows a sketch of an optical fiber laser 71 mounted in a package that acts to reduce jitter. The box 73 was first half filled with silicone 75, which was subsequently allowed to cure. The fiber laser 71 was then placed in a hard plastic tube 72 which had been preshaped to fit into the box 73. The ends were sealed with glue 74 to avoid any silicone from entering the tube. The laser 71 in tube 72 was placed on top of the cured silicone 15, and the box 73 filled with silicone 15 to cover the laser 71 completely. When the silicone 75 had cured completely, the box 73 was closed with a lid (not shown in FIG. 7).

Figure 8:
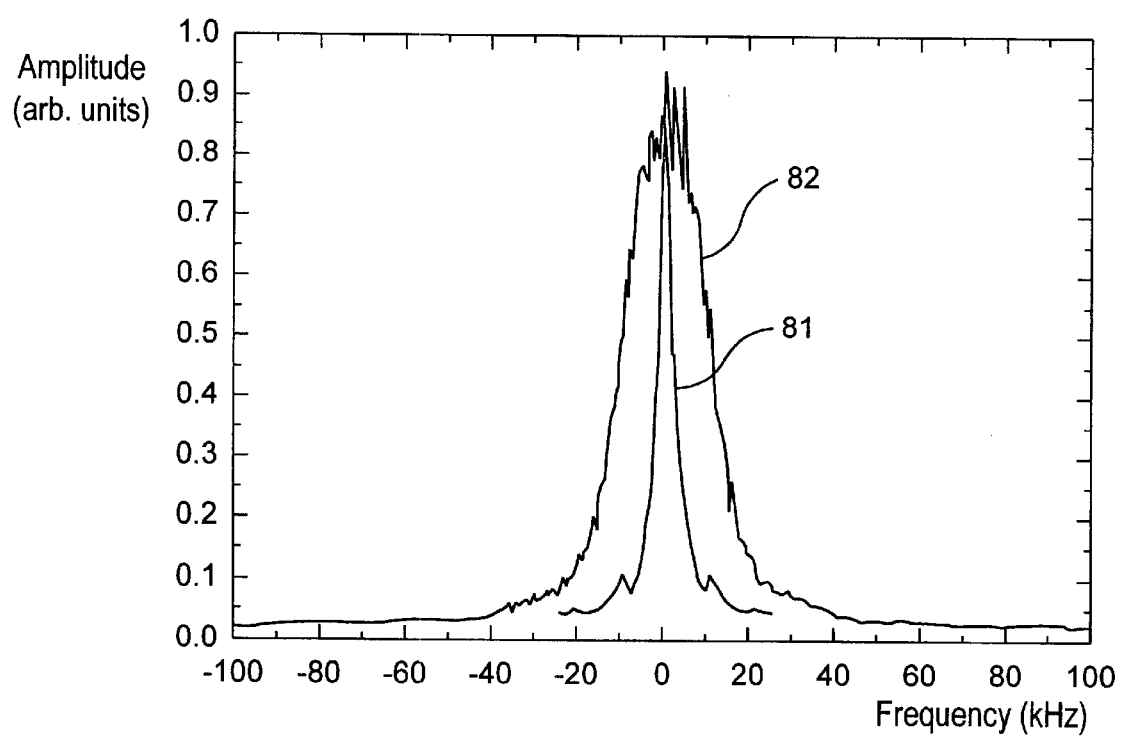
FIG. 8 shows a comparison between the linewidth of a fiber laser mounted on a temperature compensating substrate and the fiber laser packaged in a package that acts to reduce jitter. It is seen that the linewidth is reduced from approximately 10 kHz to less than 1 kHz when measured on a selfheterodyne linewidth measuring setup.

FIG. 8 shows a comparison between the linewidth of a fiber laser mounted on a temperature compensating substrate 12 and the fiber laser 71 packaged as described in this example. It is seen that the linewidth 82 is reduced from approximately 10 kHz to a linewidth 81 of less than 1 kHz when measured on a selfheterodyne linewidth measuring setup. This setup included a fiber optic Mach-Zender interferometer with one arm employing a delay line of 30 km standard fiber and the other arm employing a fiber coupled acousto-optic modulator operating at 27.12 MHz and a fiber-optic polarisation controller for polarisation axis matching. The interfering signals were detected using a 125 MHz bandwidth PIN photodetector with amplifier and an HP 1.8 GHz spectrum analyser.

What is claimed is:

1. A method of temperature stabilizing an optical waveguide (11, 12) having a positive thermal optical path length expansion, the method comprising:

affixing the optical waveguide to at least two points of a material having a negative thermal expansion; and comprising the material of a composite of a resin matrix having embedded therein fibers having a negative thermal expansion coefficient and optionally fibers having a positive thermal expansion coefficient, whereby to provide the negative thermal expansion.

2. A method according to claim 1 wherein the fibers having a negative thermal expansion coefficient have a negative thermal expansion coefficient in a range from $-5 \cdot 10^{-6}/°$ C. to $-12 \cdot 10^{-6}/°$ C., preferably from $-9 \cdot 10^{-6}/°$ C. to $-12 \cdot 10^{-6}/°$ C.

3. A method according to claim 1 wherein the fibers are in an amount from 40% to 70% by volume of the composite material.

4. A method according to claim 1 wherein the fibers are interwoven.

5. A method according to claims 1 wherein the composite material comprises 60% to 100% axially orientated fibers and 0% to 40% transversally orientated fibers.

6. A method according to claim 1 wherein the fibers are arranged in a laminated structure of more than one layer.

7. A method according to claim 1 wherein the fibers are fibers of materials selected from the group consisting of polyethylene, aramide, polyacrylate, polybenzobis-oxozole, polybenzobisthiazole, polyethylene naphthalene, polyethylene sulfide, polyamide-imide, polyether ether ketone, and polyethylene terephthaline, alone or in combination.

8. A method according to claim 1 wherein resin matrix is a consolidated matrix of epoxy resins, unsaturated polyester resins, vinyl ether resins, urethane resins and urethane acrylate resins.

9. A method according to claim 1 wherein the resin is in an amount of 30% to 60% by volume.

10. A method according claim 1 wherein the fibers are of polyethylene and the resin is an epoxy resin.

11. A method according to claim 1 wherein the material having negative thermal expansion exhibits a negative thermal expansion coefficient in the range from $-4 \cdot 10^{-6}/°$ C. to $-10 \cdot 10^{-6}/°$ C., preferably in the range from $6 \cdot 10^{-6}/°$ C. to $-9 \cdot 10^{-6}/°$ C.

12. A method according claim 1 wherein a controlled tension is applied to the optical waveguide prior to affixing it to the composite material so that the tension of the affixed waveguide is maintained as the temperature of the optical waveguide and composite material changes.

13. A method according to claim 1 wherein the optical waveguide is an optical fiber, preferably a single mode fiber.

14. A method according to claims 1 wherein the optical waveguide is an optical fiber device.

15. A method according to claims 14 wherein the optical fiber device or the optical fiber laser is polarization stable.

16. A method according to claims 14 wherein the optical fiber device or the optical fiber laser is spliced to a polarization maintaining fiber, and the axes of both have been aligned by twisting the polarization maintaining fiber and the optical fiber device or the optical fiber laser, relative to each other prior to both the optical fiber device or the optical fiber laser and the polarization maintaining fiber being affixed to the composite material having negative thermal expansion.

17. A method according to claim 1 wherein the optical waveguide is an optical fiber laser.

18. A method according to claim 1 wherein the optical waveguide is an optical fiber distributed feed back laser or a distributed Bragg reflector optical fiber laser.

19. A method according to claim 18 wherein the optical fiber distributed feed back laser is doped with one or more rare earth elements, including La, Ce, Pr, Nd, Sm, Eu, Gd, Tb, Dy, Ho, Er, Tm, Yb, and Lu, and having UV-induced Bragg gratings.

20. A method according to claim 1 wherein the composite material having a negative thermal expansion is in form of a tube, or a coating, on the optical waveguide having a positive thermal optical path length expansion.

21. A method according to claims 1 wherein the composite material having a negative thermal expansion is in the form of a substrate for the optical waveguide having a positive thermal optical path length expansion.

22. A laser device according to claims 1 wherein the optical fiber laser is an optical fiber distributed feedback laser or a distributed Bragg reflector optical fiber laser.

23. An optical fiber laser device comprising a temperature stabilized optical fiber laser (71) stabilized according to the method defined in claim 1, said optical fiber laser being incorporated inside a matrix of curable viscous material (75) having a high loss coefficient/dissipation factor in a wide range of vibration frequencies and a low thermal diffusivity selected to dampen acoustic vibrations and temperature fluctuations.

24. A laser device according to claim 23 wherein the curable viscous material is an elastomer.

25. A laser device according to claim 24 wherein the elastomer material is silicone.

26. A laser device according to claim 25 wherein the silicone is sorbothane.

27. A laser device according to claim 22 wherein the optical fiber laser is accommodated in a tube (72) of a suitable stiff material.

28. In an optical waveguide having a positive thermal expansion along an optical path length and, for temperature stabilization, a material having a negative thermal expansion affixed to the optical waveguide at least at two points spaced along the optical path length, the improvements wherein:

the material comprises a resin matrix having embedded therein fibers having a negative thermal expansion coefficient.

29. A method of temperature stabilizing an optical waveguide (11, 12), said optical waveguide having a positive thermal optical path length expansion, the method comprising:

affixing the optical waveguide to at least two points (14, 15) of a material (13) having a negative thermal expansion; and comprising said negative thermal expansion material as a composite material of a resin matrix and fibers having a negative thermal expansion coefficient embedded therein and optionally also having embedded therein fibers having a positive thermal expansion coefficient.

\* \* \* \* \*

UNITED STATES PATENT AND TRADEMARK OFFICE
CERTIFICATE OF CORRECTION

PATENT NO.    : 6,449,293 B1
DATED         : September 10, 2002
INVENTOR(S)   : Jens Engholm Pedersen et al.

It is certified that error appears in the above-identified patent and that said Letters Patent is hereby corrected as shown below:

Column 17,
Line 12, "claims 1" should read -- claim 23 --.

Signed and Sealed this

Fifteenth Day of April, 2003

JAMES E. ROGAN
*Director of the United States Patent and Trademark Office*